US012179500B2

(12) United States Patent
Ito et al.

(10) Patent No.: US 12,179,500 B2
(45) Date of Patent: Dec. 31, 2024

(54) RECORDING DEVICE

(71) Applicant: SEIKO EPSON CORPORATION, Tokyo (JP)

(72) Inventors: Shun Ito, Matsumoto (JP); Keiichi Yato, Matsumoto (JP); Yosuke Nakano, Matsumoto (JP); Haruna Takahashi, Ina (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 18/055,126

(22) Filed: Nov. 14, 2022

(65) Prior Publication Data

US 2023/0150283 A1 May 18, 2023

(30) Foreign Application Priority Data

Nov. 15, 2021 (JP) ................................ 2021-185445

(51) Int. Cl.
*B41J 29/02* (2006.01)

(52) U.S. Cl.
CPC .................................... *B41J 29/02* (2013.01)

(58) Field of Classification Search
CPC ........................................................ B41J 29/02
See application file for complete search history.

(56) References Cited

U.S. PATENT DOCUMENTS

2005/0156961 A1* 7/2005 Silverbrook ......... B41J 11/0022 347/5
2021/0260897 A1 8/2021 Yoda

FOREIGN PATENT DOCUMENTS

| | | |
|---|---|---|
| CN | 209291648 | 8/2019 |
| CN | 210234395 | 4/2020 |
| CN | 114889340 | 8/2022 |
| JP | 2021-133527 A | 9/2021 |
| KR | 20020001448 | 1/2002 |

* cited by examiner

*Primary Examiner* — Justin Seo
(74) *Attorney, Agent, or Firm* — WORKMAN NYDEGGER

(57) ABSTRACT

A recording device includes a recording unit, a support portion for supporting a recording medium, a transport path for transporting the recording medium, a recording medium holding unit for holding a roll body and supplying the recording medium, and a frame for holding thereof, wherein the frame includes a lower frame extending along an X direction and a Y direction, a pair of side frames extending along a Z direction and the Y direction, each including a lower end fixed to the lower frame and upright in the Z direction, and disposed at a predetermined interval in the X direction, and a base frame held between the pare of side frames and including four wall surfaces extending in the X direction, and functional components related to recording of the recording unit are disposed inside the four wall surfaces.

15 Claims, 10 Drawing Sheets

RECORDING DEVICE

The present application is based on, and claims priority from JP Application Serial Number 2021-185445, filed Nov. 15, 2021, the disclosure of which is hereby incorporated by reference herein in its entirety.

BACKGROUND

1. Technical Field

The present disclosure relates to a recording device.

2. Related Art

Conventionally, large format inkjet printers have been known as recording devices. Some of such recording devices use a recording medium wound in a roll shape. For example, JP-A-2021-133527 discloses a recording device holding two roll bodies, which are before recorded and after recorded.

However, the recording device described in JP-A-2021-133527 has a problem that a wide installation space is required. Specifically, in the above-described recording device, a leg portion supports a housing, and each of the roll bodies is disposed in the front and the rear of the leg portion. Thus, a large installation space is required due to an increase in size in the front and the rear directions. In addition, when a new roll body is mounted, a space for the user to work behind is required. Furthermore, there is a problem that the appearance has many irregularities and thus improvement in design properties is difficult.

In contrast, in a case where the entirety of the device is formed as a rectangular parallelepiped housing and a printing unit, the leg portion, the roll body, and the like are accommodated in the housing, there is a problem in that mechanical strength of the recording device is easily reduced. Specifically, in the configuration described above, a side frame may be extended downward, and thus rigidity of the frame may be insufficient. In other words, there has been a demand for a recording device that has excellent design properties and mechanical strength and reduces the installation space.

SUMMARY

A recording device includes a recording unit, a support portion including a support face for supporting a recording medium on which recording is performed by the recording unit at a position facing the recording unit, a transport path for transporting the recording medium to the support portion, a recording medium holding unit for holding a roll body on which the recording medium is wound and supplying the recording medium to the transport path, and a frame for holding the recording unit, the support portion, the transport path, and the recording medium holding unit, wherein the frame includes a lower frame extending along a first direction and extending along a second direction intersecting the first direction, a pair of side frames extending along a third direction intersecting the first direction and the second direction and the second direction, each including a lower end fixed to the lower frame and upright in the third direction, and disposed at a predetermined interval in the first direction, and a base frame held between the pair of side frames and including four wall surfaces extending in the first direction, and functional components related to recording of the recording unit are disposed inside the four wall surfaces of the base frame.

BRIEF DESCRIPTION OF THE DRAWINGS

FIG. 7 is a perspective cross-sectional view illustrating a configuration of a support portion, a negative pressure chamber, and the like.

DESCRIPTION OF EXEMPLARY EMBODIMENTS

In the embodiments described below, a large format ink jet printer is illustrated as a recording device, and will be described with reference to the drawings. For convenience of illustration, the size of each member is different from actual. A recording medium having a width of, for example, 297 mm or more can be applied to the large format inkjet printer.

In each of the drawings, XYZ axises are provided, as necessary, as coordinate axises orthogonal to each other, and a direction indicated by each arrow is referred to as a + direction, and a direction opposite to the + direction is referred to as a − direction. When the recording device is disposed on a horizontal surface, the Z-axis is along a vertical direction. The +Y direction and the −Y direction may be referred to as a front side and a rear side, respectively, and the +Z direction and the −Z direction may be referred to as an upper side and a lower side, respectively.

In the present disclosure, a first direction is a direction along an X-axis, a second direction intersecting the first direction is a direction along a Y-axis, and a third direction intersecting the first direction and the second direction is a direction along the Z-axis. The direction along the X-axis is simply referred to as an X direction, the direction along the Y-axis is simply referred to as a Y direction, and the direction along the Z-axis is simply referred to as a Z direction.

In a path of the recording medium in which the recording medium is unwound from the roll body of an original fabric, recording is performed, and a recorded matter is discharged from a recording device, a side closer to the original fabric may be also referred to as an upstream side, a side from which the recorded matter is discharge may be referred to as a downstream side, and a direction from the upstream side to the downstream side may be also referred to as a transport direction.

Figure 1:
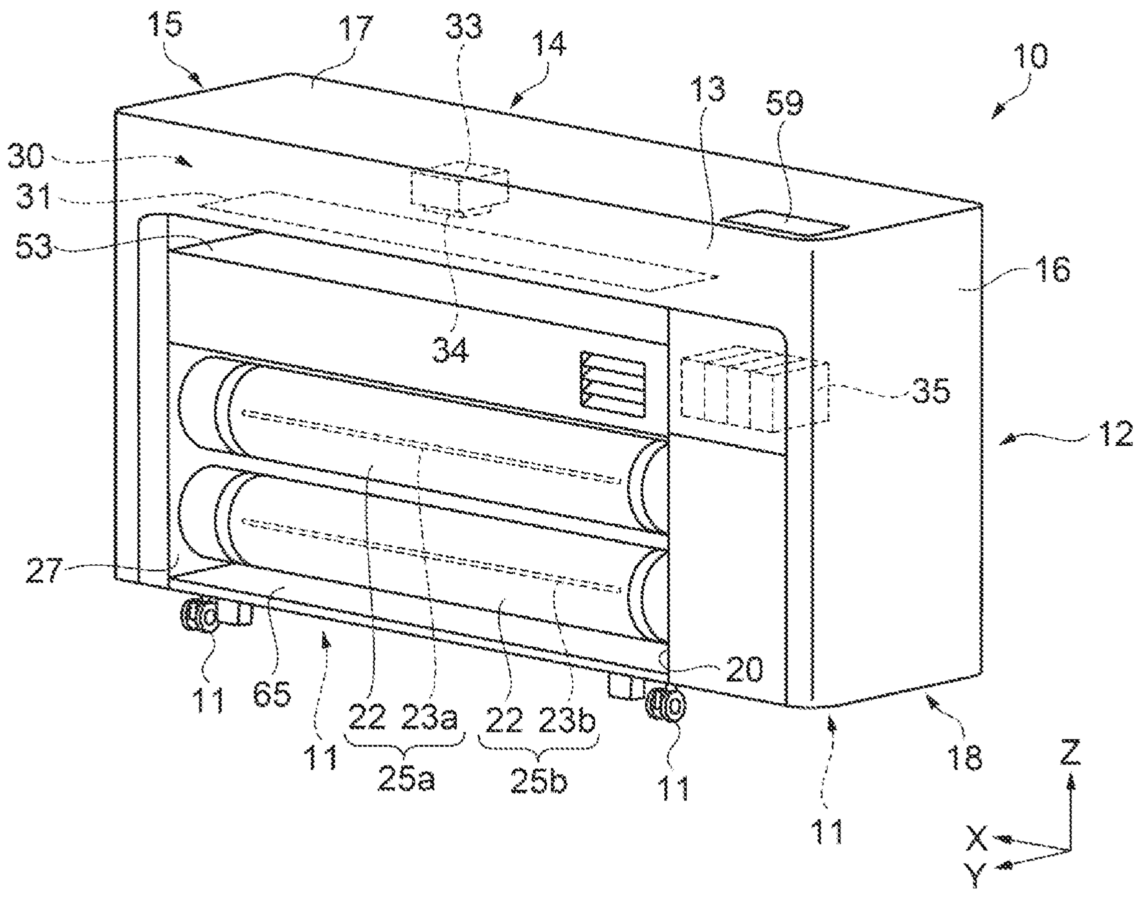
FIG. 1 is a perspective view illustrating a configuration of a recording device according to an embodiment.

As illustrated in FIG. 1, a recording device 10 according to the present embodiment includes a housing 12 having a substantially rectangular parallelepiped shape elongated in the X direction and high in the Z direction. The housing 12 includes a front surface 13, a rear surface 14, side surfaces 15 and 16, an upper surface 17, and a bottom surface 18.

The recording device 10 includes, inside the housing 12, a recording unit 30, a support portion 31, and a recording medium holding unit 20. Although not illustrated, the recording device 10 also includes a transport path, a frame, which is a framework of the recording device 10, and a control unit. The recording device 10 includes four leg portions 11 on the bottom surface 18.

The recording unit 30 is disposed on the upper side in the inside of the housing 12. The recording unit 30 includes a carriage 33 and a recording head 34. The carriage 33 is disposed on the upper side of the support portion 31. The recording head 34 is disposed on the lower side of the carriage 33, and faces the support portion 31 in the Z direction.

The recording head 34 includes a nozzle surface (not illustrated) on a surface facing the support portion 31. A plurality of nozzle rows are disposed on the nozzle surface. Each of the plurality of nozzle rows includes a plurality of nozzles, and individually ejects a ink that exhibits a color such as cyan, magenta, yellow, or black. These inks are supplied from an ink cartridge 35 to the recording head 34 via a pipe (not illustrated). In the present specification, a liquid including a clear ink, a processing liquid, and the like in addition to the ink of each of the colors described above dejected by the recording unit 30 is simply referred to as an ink.

The support portion 31 supports the recording medium when recording is performed on the recording medium (not illustrated) by the recording head 34. The support portion 31 has a substantially rectangular shape elongated in the X direction. The recording head 34 is supported on a part of a frame described below, and moves in the X direction in a range corresponding to the support portion 31.

A paper exit 53 and a roll body accommodation port 27 are disposed in the front surface 13 of the housing 12. The paper exit 53 is located on the front side of the support portion 31 and is a slit elongated in the X direction and corresponding to the width of the recording medium. In the paper exit 53, the recording medium on which the recording is perfumed is discharged from inside the housing 12 to the outside on the front side.

The roll body accommodation port 27 is an opening portion having a substantially rectangular shape corresponding to two roll bodies **25*a* and 25*b*. The roll body accommodation port 27 extends from the vicinity of the bottom surface 18 of the housing 12 to the middle of height of the housing 12 in the Z direction and is longer than lengths of the roll bodies 25*a* and 25*b* in the X direction. The roll bodies 25*a* and 25*b* are visually recognized from the +Y direction through the roll body accommodation port 27**.

The recording medium 22 before recorded is wound on a core member **23*a* in the roll body 25*a*. The recording medium 22 before recorded is wound on a core member 23*b* in the roll body 25*b*. Each of the roll bodies 25*a* and 25*b* has a substantially cylindrical shape, and the height direction of the cylinder is along the X direction. The roll body 25*b* is disposed in the vicinity of the bottom surface 18 of the housing 12, and the roll body 25*a* is disposed on the upper side of the roll body 25*b*. Examples of the recording medium 22** include paper such as coated paper, a sheet of resin such as vinyl chloride, and a fabric.

The recording medium holding unit 20 holds the roll bodies **25*a* and 25*b* and supplies each recording medium 22 before recorded from the roll bodies 25*a* and 25*b*** to the transport path.

An input unit 59 is disposed on the upper surface 17 in the −X direction and the +Y direction. The input unit 59 is, for example, a touch panel type liquid crystal display device. The input unit 59 is electrically coupled to the control unit. In the input unit 59, various types of operations of the recording device 10 are input, and various types of information of the recording device 10 are displayed.

The control unit includes a Central Processing Unit (CPU), a Read Only Memory (ROM), and a Random Access Memory (RAM). The control unit is electrically coupled to each component of the recording device 10, and integrally controls the operation of the recording device 10. The recording device 10 may be operated from an information device such as a personal computer via the control unit.

Figure 2:
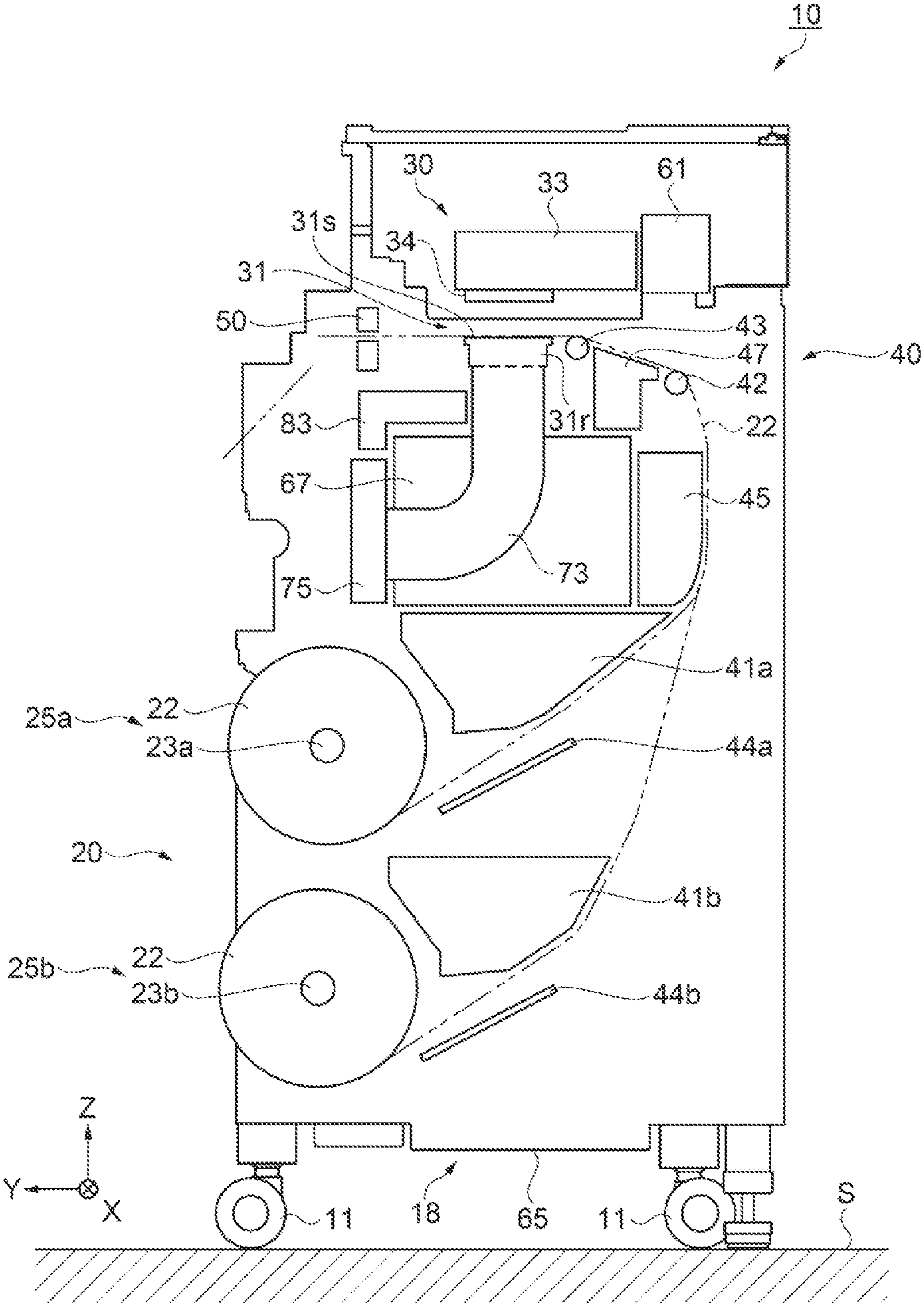
FIG. 2 is a schematic cross-sectional view illustrating an internal configuration of the recording device.

As illustrated in FIG. 2, in the recording device 10, main components are disposed around a base frame 67. The base frame 67 extends in the X direction. Here, FIG. 2 is a cross-section taken along the YZ plane and dividing the duct 73. The four leg portions 11 are disposed on the lower frame 65 forming the bottom surface 18. Note that a configuration of the frame including the base frame 67 in the recording device 10 will be described later.

The recording device 10 is installed on an installation surface S via the four leg portions 11 for supporting the lower frame 65. The leg portions 11 are, for example, members such as casters or adjusters capable of supporting and fixing a heavy load. The leg portions 11 are not limited to four, and may be five or more. Both the casters and the adjusters may also be included.

In the recording device 10, the recording medium 22 is transported from the recording medium holding unit 20 to the paper exit 53 described above through the transport path 40 and a position where the recording unit 30 and the support portion 31 are facing each other.

Although not illustrated, the recording medium holding unit 20 includes feeding mechanisms of recording mediums 22, each corresponding to a respective one of the roll bodies **25*a* and 25*b*. A user selects which recording medium 22 among the roll bodies 25*a* and 25*b* is to be used. The recording medium 22 is fed from the recording medium holding unit 20 to the rear side and the upper side and advances to the transport path 40**.

The transport path 40 transports the recording medium 22 to the support portion 31. The transport path 40 is formed of lower face side path forming members **41*a* and 41*b*, inclined surfaces 44*a* and 44*b*, a rear face side path forming member 45, and an upper face side path forming member 47. For these members forming the transport path 40, a material such as resin having a small coefficient of friction is employed so that the recording medium 22 slides on the material. Note that the lower face side path forming member 41*a*** is an example of the lower face side path forming member of the present disclosure.

The transport path 40 includes an intermediate roller 42 and a transport roller 43 as transport rollers for transporting the recording medium 22 in the transport direction. In the intermediate roller 42 and the transport roller 43, a material such as rubber or resin-based elastomer having a large coefficient of friction is used on a surface with which the recording medium 22 comes into contact.

The transport path 40 extends from the lower side to the upper side via the rear side with respect to the base frame 67. In the transport path 40, the lower face side path forming member 41*a* and the inclined surface 44*a* or the lower face side path forming member 41*b* and the inclined surface 44*b*, the rear face side path forming member 45, the intermediate roller 42, the upper face side path forming member 47, and the transport roller 43 are disposed in this order from the upstream toward the support portions 31 in the downstream.

The lower face side path forming members 41*a* and 41*b* and the inclined surfaces 44*a* and 44*b* are disposed on the lower side of the base frame 67. The lower face side path forming member 41*a* and the inclined surface 44*a* are disposed corresponding to the roll body 25*a*. The lower face side path forming member 41*b* and the inclined surface 44*b* are disposed corresponding to the roll body 25*b*. Each of the lower face side path forming members 41*a* and 41*b* corresponds to a rear surface of a recording surface of a respective one of the recording mediums 22, and each of the inclined surfaces 44*a* and 44*b* corresponds to the recording surface of a respective one of the recording mediums 22.

The rear face side path forming member 45 is disposed on the rear side of the base frame 67. The recording mediums 22 are transported to the upper side along the rear face side path forming member 45.

The transport direction of the recording medium 22 is changed to the substantially +Y direction at the intermediate roller 42. The intermediate roller 42, the upper face side path forming member 47, and the transport roller 43 are located on the upstream side in the transport direction of the recording medium 22 transported to a support face 31*s* of the support portion 31, and are disposed on the upper side and closer to the rear side of the base frame 67.

The intermediate roller 42 and the transport roller 43 are driven by a motor (not illustrated) to rotate counterclockwise in a side view from the −X direction, and transport the recording medium 22 downstream. The upper face side path forming member 47 is located between the intermediate roller 42 and the transport roller 43, and guides the recording medium 22.

The support portion 31 is disposed downstream of the transport roller 43 and on the upper side of the base frame 67. The recording head 34 of the recording unit 30 is disposed on the upper side of the support portion 31. The support portion 31 includes a negative pressure chamber 31*r*, the support face 31*s*, and a plurality of openings described below. The support face 31*s* supports the recording medium 22 at a position facing the recording unit 30. At this position, recording is performed on the recording medium 22.

The negative pressure chamber 31*r* is disposed on the lower side of the support face 31*s*. The plurality of openings are provided on the support face 31*s*, and communicate with the support face 31*s* from the inside of the negative pressure chamber 31*r*. The support face 31*s* is disposed on the upper side of the negative pressure chamber 31*r* to face the recording unit 30 in the Z direction.

The recording device 10 includes a negative pressure mechanism 75 and a duct 73. The negative pressure mechanism 75 is on the front side of the base frame 67. The duct 73 is located inside the base frame 67 and is curved. One end of the duct 73 is coupled to the rear side of the negative pressure mechanism 75, and the other end protrudes to the upper side from the base frame 67 to communicate with the negative pressure chamber 31*r*.

The duct 73 allows the negative pressure chamber 31*r* and the negative pressure mechanism 75 to communicate with each other. The negative pressure mechanism 75 includes, for example, a suction fan and applies negative pressure to the negative pressure chamber 31*r*. That is, the recording medium 22 is adsorbed to the support face 31*s* by the negative pressure generated by the negative pressure mechanism 75. This can suppress the occurrence of wrinkles and misalignment of the recording medium 22 in the support portion 31.

The recording head 34 is located on the lower side of the carriage 33 and is disposed to face the support face 31*s*. Although not illustrated, the recording head 34 includes an actuator, which is a driving means for ink discharging. Examples of the actuator include a piezoelectric element, an electro-mechanical conversion element for displacing a vibration plate by electrostatic adsorption, and an electro-thermal conversion element for ejecting ink droplets by gas bubbles generated by heating.

The carriage 33 is supported by a guide rail (not illustrated) of a main frame 61. The main frame 61 has a quadrangular prism shape having a substantially rectangular cross-section. The main frame 61 is disposed on the upper side of the intermediate roller 42 with the height direction of the quadrangular prism being along the X direction.

The main frame 61 supports the carriage 33 of the recording unit 30 via the guide rail movably in the X direction. In other words, the carriage 33 is allowed to scan in the X direction by driving of the motor (not illustrated) while being supported by the main frame 61. The recording medium 22 is transported while the carriage 33 is allowed to scan, and the ink is adhered to the recording medium 22 from the recording head 34, and thus images, colors, texts, and the like are recorded on the recording medium 22 to produce a recorded matter.

The recording device 10 includes a maintenance tank 83 for collecting an ink ejected to be discarded on the support face 31*s* during borderless printing or the like. The maintenance tank 83 is disposed on the upper side and on the front side of the base frame 67. Although not illustrated, a gutter portion is coupled to the maintenance tank 83 from the support face 31*s*. The ink is guided from the support face 31*s* into the maintenance tank 83 via the gutter portion. An absorbent material for absorbing and retaining the ink is disposed inside the maintenance tank 83.

A cutting portion 50 is disposed in the downstream of the support portion 31. The cutting portion 50 cuts the recording medium 22 along the X direction at a desired position. The recording medium 22 is discharged as the recorded matter to the front side from the paper exit 53 described above.

Figure 3:
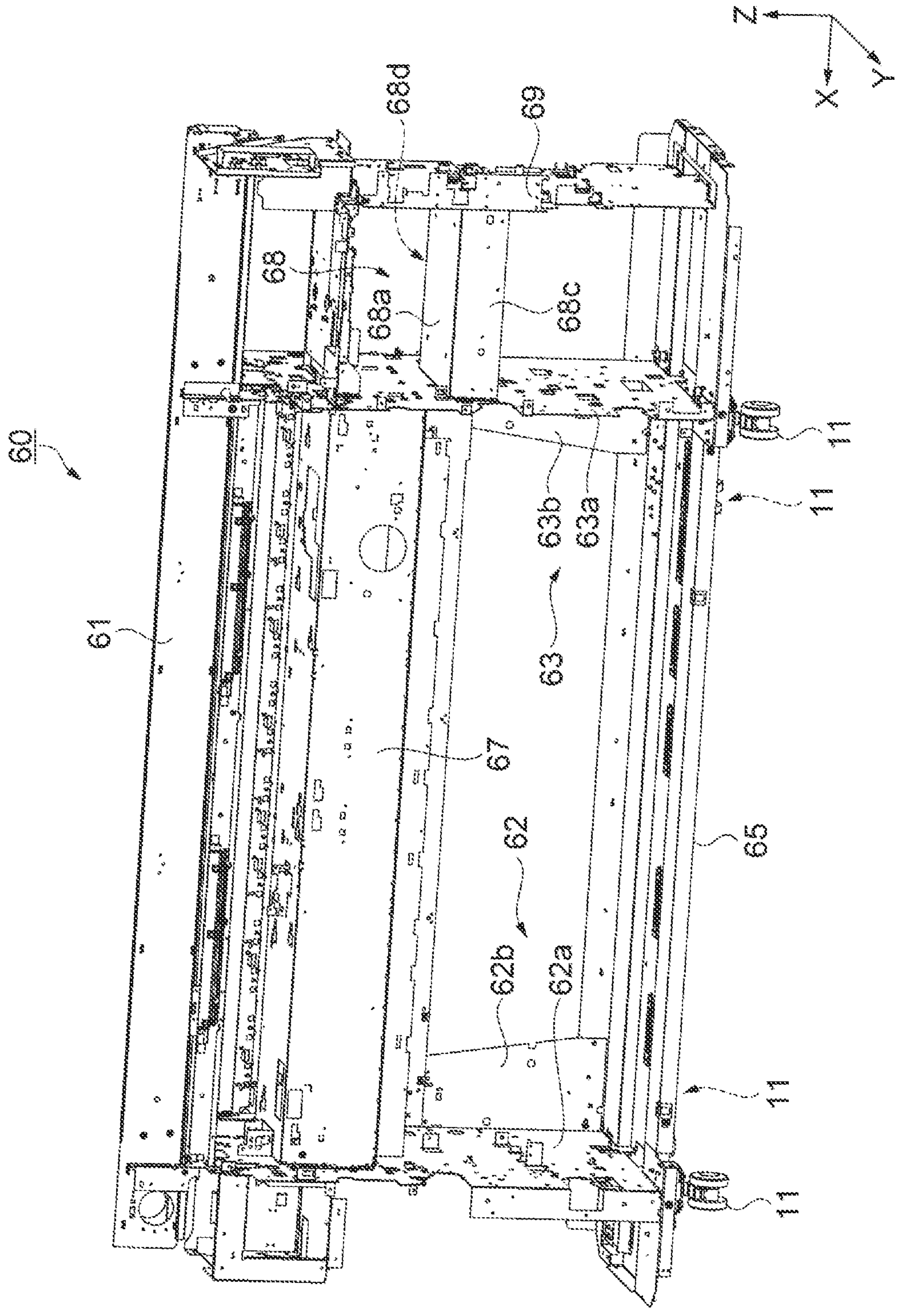
FIG. 3 is a perspective view illustrating a configuration of a frame.

As illustrated in FIG. 3, the frame 60 of the recording device 10 includes the main frame 61, the base frame 67, the lower frame 65, a pair of side frames 62 and 63, a sub-frame 69, and a sub-base frame 68. These are assembled to form the frame 60. The frame 60 holds the recording unit 30, the support portion 31, the transport path 40, and the recording medium holding unit 20 described above.

The lower frame 65 is located closer to the lowest side of the frame 60. The lower frame 65 is a member elongated in the X direction and is along the X direction and extends along the Y direction. Although not illustrated, the lower frame 65 includes a plurality of ribs extending along the X direction and a bent portion. In the X direction, the length of the lower frame 65 is substantially equal to the length of the housing 12 of the recording device 10 described above.

Each of the pair of side frames 62 and 63 includes a lower end fixed to a surface on the upper side of the lower frame 65, and is upright in the Z direction. When viewed from the Y direction, the side frame 62 is disposed in the +X direction, and the side frame 63 is disposed in the −X direction. The side frame 62 includes a first portion 62*a* and a second portion 62*b*. The side frame 63 includes a first portion 63*a* and a second portion 63*b*.

The first portions 62*a* and 63*a* extend in the Z direction and the Y direction. The second portion 62*b* is bent and extends from the first portion 62*a* in the X direction, in particular in the −X direction. The second portion 63*b* is bent and extends from the first portion 63*a* in the X direction, in particular in the +X direction. The pair of side frames 62 and 63 are disposed to face each other in the X direction with a predetermined gap therebetween. The predetermined gap is, for example, a distance longer than the length in the X direction of the roll body 25*a* described above.

Each of the four leg portions 11 is disposed overlapping one of the first portions 62*a* and 63*a* and the second portions 62*b* and 63*b* when viewed from the Z direction. Specifically, the leg portion 11 in the −X direction and on the front side overlaps the first portion 63*a*, and the leg portion 11 in the −X direction and on the rear side overlaps the second portion 63*b*. The leg portion 11 in the +X direction and on the front side overlap the first portion 62*a*, and the leg portion 11 in the +X direction and on the rear side overlap the second portion 62*b*.

As a result, the leg portions 11 are provided in positions where the lower frame 65 fixes the side frames 62 and 63, and thus the lower frame 65 is reinforced by the side frames 62 and 63, and deformation of the lower frame 65 can be suppressed. The recording device 10 can be stably installed by the four leg portions 11.

The base frame 67 has a box shape of the substantially quadrangular prism shape, and the height direction of the quadrangular prism is along the X-axis. The base frame 67 is held between the pair of side frames 62 and 63 on the upper side than the middle of the pair of side frames 62 and 63 in the Z direction. The base frame 67 holds a part of the main components of the recording device 10.

The recording medium holding unit 20 described above is disposed between the pair of side frames 62 and 63 in the X direction and between the base frame 67 and the lower frame 65 in the Z direction.

The main frame 61 is supported on upper end portions of the pair of side frames 62 and 63. The main frame 61 extends in the +X direction from the side frame 62, and extends in the −X direction from the side frame 63. In the X direction, the length of the main frame 61 is substantially equal to the length of the lower frame 65. The main frame 61 is fixed to the pair of side frames 62 and 63 in the X direction along with the lower frame 65, and thus the rigidity of the frame 60 is further improved.

The sub-frame 69 and the sub-base frame 68 are disposed in the −X direction that is one of the X direction. The sub-frame 69 and the sub-base frame 68 are not limited to be disposed in the −X direction, and may be disposed on both sides or one side in one −X direction and the other +X direction in the X direction.

The sub-frame 69 includes a lower end fixed to the surface on the upper side of the lower frame 65, and is upright in the Z direction. The side frame 63 and the sub-frame 69 are disposed to face each other in the X direction with the sub-base frame 68 interposed therebetween. The sub-frame 69 includes an upper end for supporting the main frame 61.

The sub-base frame 68 includes three wall surfaces 68*a*, 68*c*, and 68*d* extending in the X direction. The wall surface 68*a* is along the XY plane, and the wall surfaces 68*c* and 68*d* are along the XZ plane. The ink cartridge 35 described above is accommodated on the upper side of the sub-base frame 68. Accordingly, the rigidity of the frame 60 is improved, and a space inside the frame 60 can be effectively utilized. Note that an ink tank or the like having a larger capacity than the ink cartridge 35 may be accommodated between the sub-base frame 68 and the lower frame 65.

When viewed from the Y direction, the base frame 67 and the sub-base frame 68 are located at different positions in the Z direction. Thus, the rigidity of the frame 60 is further improved.

The side frames 62 and 63, the lower frame 65, the base frame 67, the sub-base frame 68, and the sub-frame 69 are formed of a flat plate made of iron, aluminum, alloy, or the like, and are shaped through machining such as drilling, bending, and the like. Means such as fitting, fastening by screws, rivets, or the like, joining, and the like are employed singly or in combination for assembling the frame 60. The frame 60 may further include additional structural members in addition to each of the frames described above.

Figure 4:
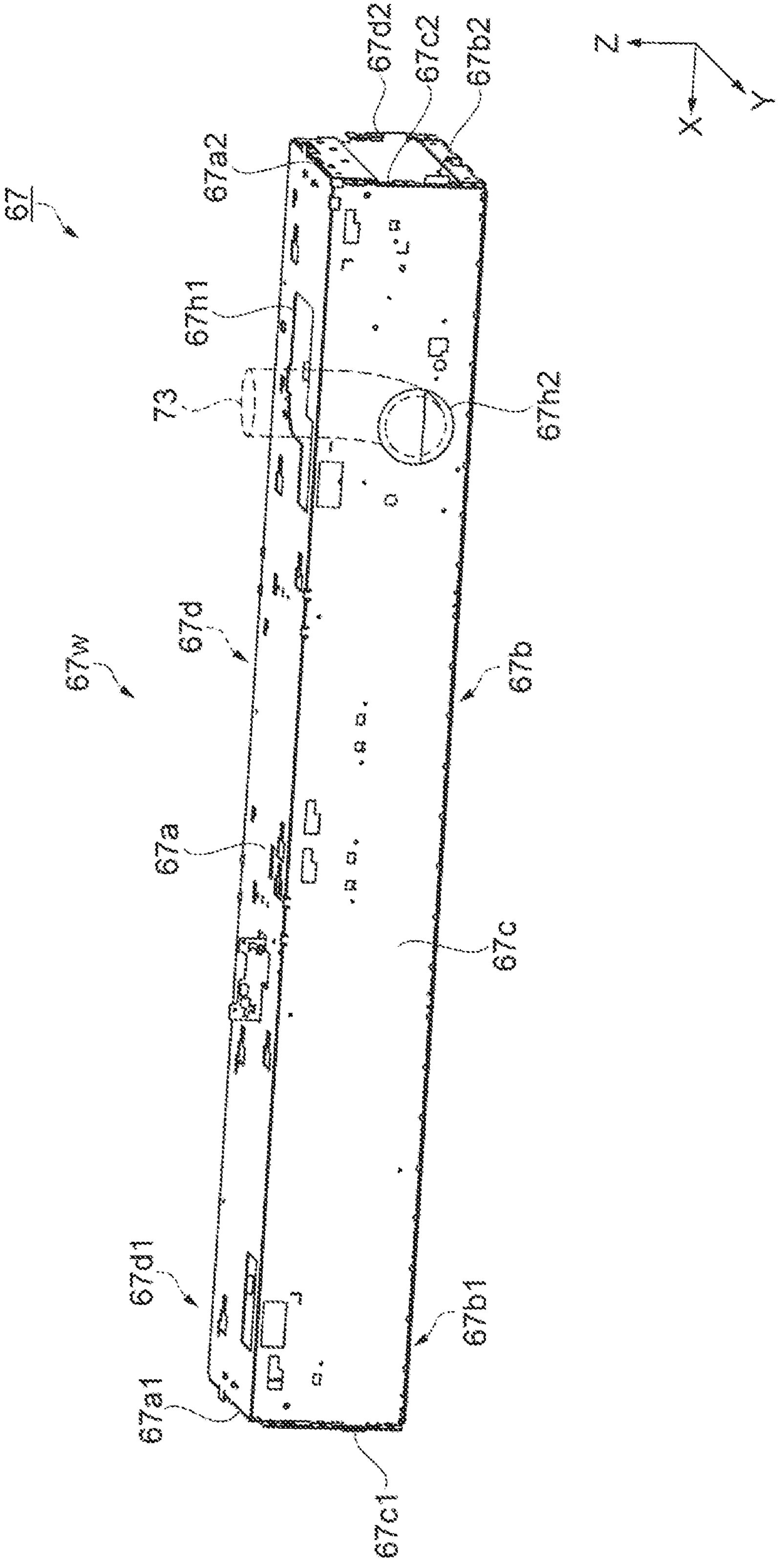
FIG. 4 is a perspective view illustrating an appearance of a base frame.

As illustrated in FIG. 4, the base frame 67 includes a top wall surface 67*a*, a lower wall surface 67*b*, a front wall surface 67*c*, and a rear wall surface 67*d* as four wall surfaces extending in the X direction. In the following description, the four wall surfaces may be also collectively referred to as four wall surfaces 67*w*.

Each of the four wall surfaces 67*w* has a substantially rectangular shape elongated in the X direction. The upper wall surface 67*a* and the lower wall surface 67*b* are along the XY plane to face each other in the Z direction. The front wall surface 67*c* and the rear wall surface 67*d* are along the XZ plane to face each other in the Y direction.

At the upper wall surface 67*a*, an end portion in the +X direction is referred to as an end portion 67*a*1, and an end portion in the −X direction is referred to as an end portion 67*a*2. At the lower wall surface 67*b*, an end portion in the +X direction is referred to as an end portion 67*b*1, and an end portion in the −X direction is referred to as an end portion 67*b*2. At the front wall surface 67*c*, an end portion in the +X direction is referred to as an end portion 67*c*1, and an end portion in the −X direction is referred to as an end portion 67*c*2. At the rear wall surface 67*d*, an end portion in the +X direction is referred to as an end portion 67*d*1, and an end portion in the −X direction is referred to as an end portion 67*d*2.

A through hole 67*h*1 is disposed on the upper wall surface 67*a* closer to the end portion 67*a*2 than a center in the X direction. A through hole 67*h*2 is disposed on the front wall surface 67*c* closer to the end portion 67*c*2 than the center in the X direction. Through holes 67*h*1 and 67*h*2 correspond to the duct 73 illustrated in dashed lines. The duct 73 protrudes on the upper side from the through hole 67*h*1 and is coupled to the negative pressure chamber 31*r* described above. The duct 73 is coupled to the negative pressure chamber 75 described above via the through hole 67*h*2.

Figure 5:
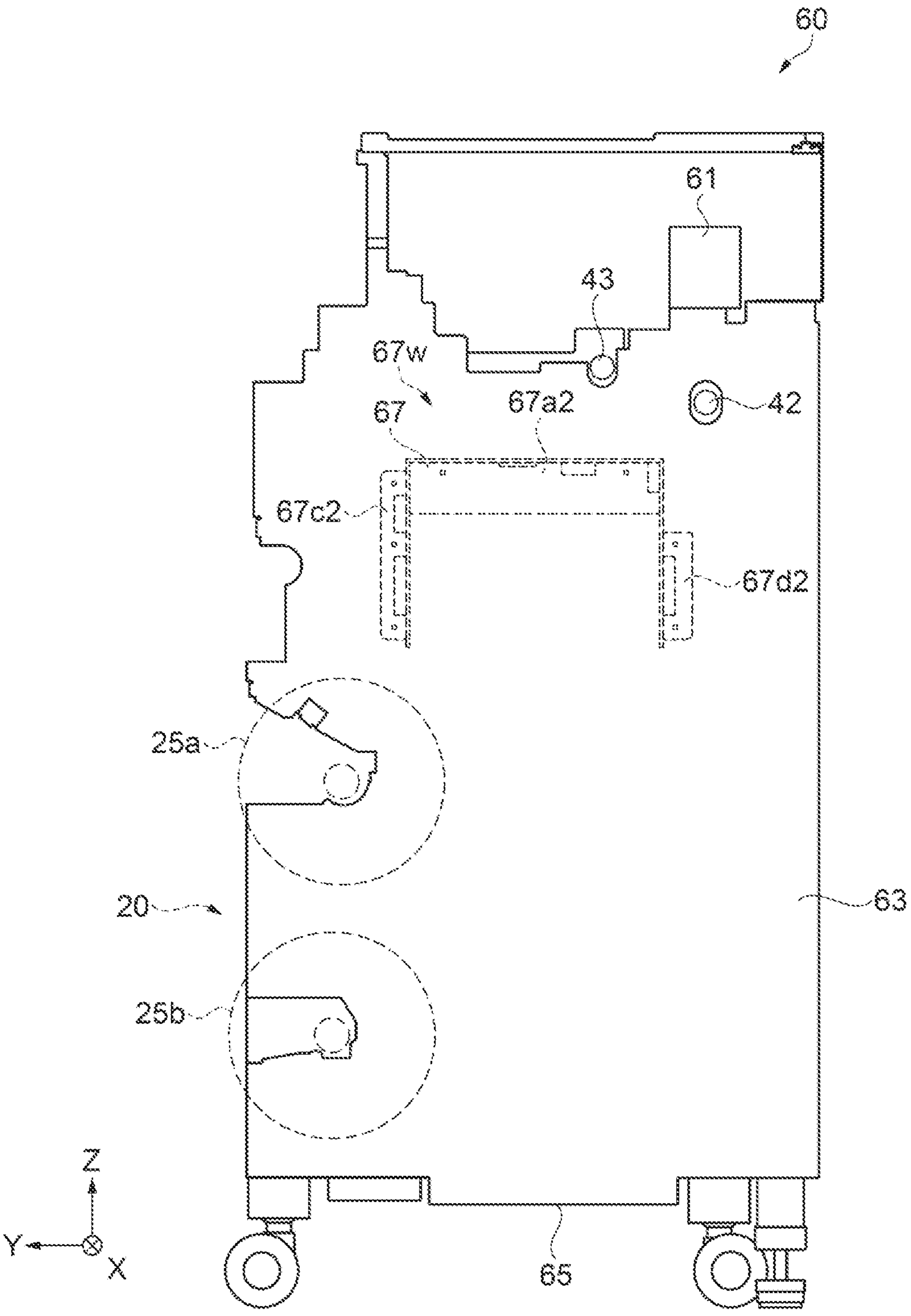
FIG. 5 is a schematic side view illustrating a holding state of the base frame or the like in a side frame.

As illustrated in FIG. 5, in the four wall surfaces 67*w* of the base frame 67, three end portions 67*a*2, 67*c*2, and 67*d*2 are fixed from the +X direction to the side frame 63 that is one of the pair of side frames 62 and 63 in the −X direction that is one of the X direction. Note that all of four end portions 67*a*2, 67*b*2, 67*c*2, and 67*d*2 of the four wall surfaces 67*w* may be fixed to the side frame 63, but at least two of the four end portions 67*a*2, 67*b*2, 67*c*2, and 67*d*2 may be fixed.

Although not illustrated, in the same manner as described above, in the four wall surfaces 67*w*, three end portions 67*a*1, 67*c*1, and 67*d*1 are fixed from the −X direction to the side frame 62 that is the other of the pair of side frames 62 and 63 in the +X direction that is the other of the X direction. Note that all of the four end portions 67*a*1, 67*b*1, 67*c*1, and 67*d*1 of the four wall surfaces 67*w* may be fixed to the side frame 62, but at least two of the four end portions **67*a*1, 67*b*1, 67*c*1, and 67*d*1** may be fixed.

As described above, at least two of the four wall surfaces **67*w* are sandwiched between the pair of side frames 62 and 63 to be fixed. This allows the rigidity of the frame 60** to be further improved.

Each of the intermediate roller 42 and the transport roller 43 includes an end portion of a shaft in the −X direction rotatably held by the side frame 63. Although not illustrated, each of the intermediate roller 42 and the transport roller 43 includes an end portion of the shaft in the +X direction rotatably held by the side frame 62.

The main frame 61 is disposed on the upper rear side of the base frame 67 when viewed from the X direction. This ensures a movable range (not illustrated) of the recording unit 30 that is supported by the main frame 61 and moves in the X direction.

When viewed from the Z direction, the recording medium holding unit 20 is located on the front wall surface **67*c* side of the base frame 67 in the Y direction. When viewed from the Z direction, at least a part of the recording medium holding unit 20 is disposed overlapping the base frame 67 in the Y direction. Accordingly, the length in the front-rear direction is shortened, and the recording device 10** can be miniaturized.

Figure 6:
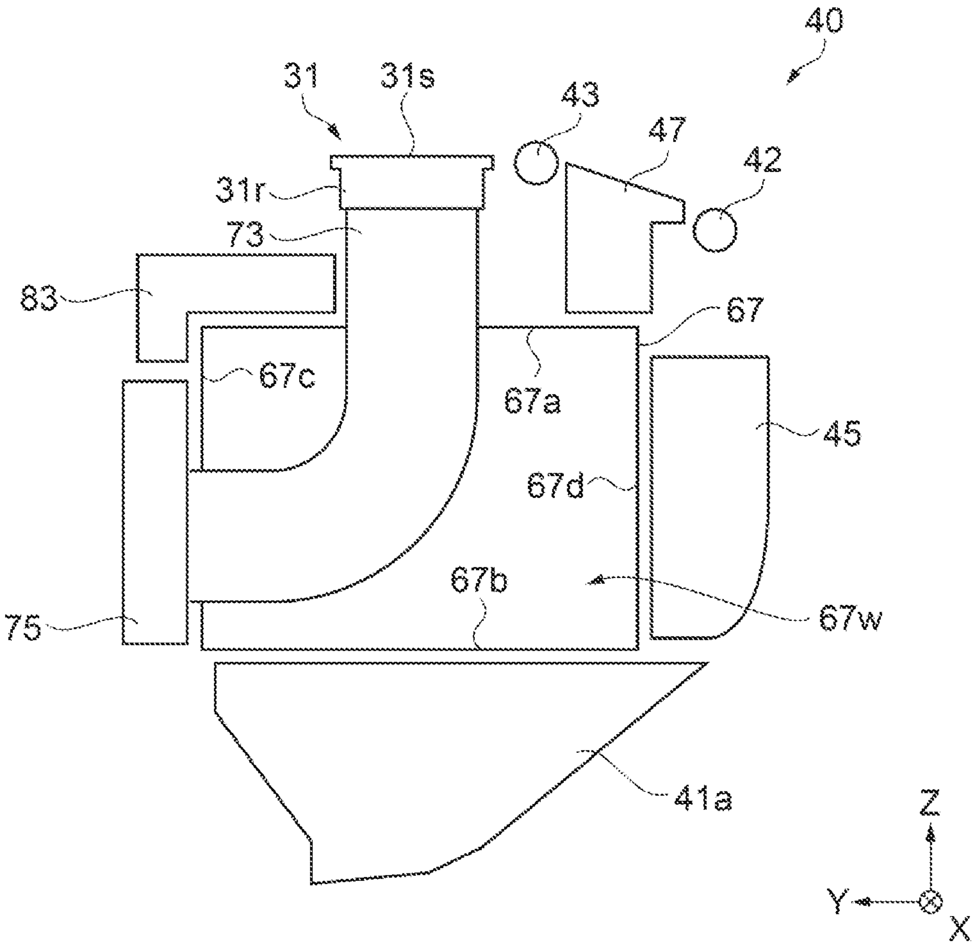
FIG. 6 is a schematic side view illustrating an arrangement of each member held in the base frame.

As illustrated in FIG. 6, the duct 73, which is a functional component related to the recording of the recording unit 30, is disposed inside the four wall surfaces **67*w* of the base frame 67. Thus, the inside of the base frame 67 is effectively utilized, and the recording device 10 can be miniaturized. Note that the above-described functional components disposed inside the four wall surfaces 67*w* are not limited to the duct 73. Here, the above-described functional components include all components attached to the base frame 67, and examples thereof include, for example, the negative pressure chamber 31*a*, the negative pressure mechanism 75, and the maintenance tank 83**.

The negative pressure chamber **31*r* is held on the upper side of the upper wall surface 67*a* among the four wall surfaces 67*w* of the base frame 67. Thus, a plurality of openings (not illustrated) for the communication between the negative pressure chamber 31*r* and the support face 31*s* are disposed outside the base frame 67. As a result, the base frame 67 need not be provided with holes corresponding to the plurality of openings, and the rigidity of the base frame 67 is improved. Since the negative pressure chamber 31*r* is located outside the base frame 67, a maintenance property of the negative pressure chamber 31*r*** can be improved.

A part of or the entirety of the negative pressure chamber **31*r* may be disposed inside the base frame 67. That is, for example, the negative pressure chamber 31*r* may be held on the lower side of the upper wall surface 67*a*. Thus, the inside of the base frame 67 is effectively utilized, and the recording device 10** can be miniaturized.

The negative pressure mechanism 75 is held in the +Y direction of the front wall surface **67*c* among the four wall surfaces 67*w* of the base frame 67. Thus, air can flow from the negative pressure mechanism 75 to the front side of the recording device 10 via the front wall surface 67*c***.

A part of or the entirety of the negative pressure mechanism 75 may be disposed inside the base frame 67. That is, for example, the negative pressure mechanism 75 may be held in the −Y direction of the front wall surface **67*c*. Thus, the inside of the base frame 67 is effectively utilized, and the recording device 10** can be miniaturized.

The maintenance tank 83 is disposed between the upper wall surface **67*a* of the base frame 67 and the negative pressure chamber 31*r***.

The lower face side path forming member **41*a* is held on the lower wall surface 67*b* among the four wall surfaces 67*w* of the base frame 67. The rear face side path forming member 45 is held on the rear wall surface 67*d* among the four wall surfaces 67*w* of the base frame 67. The upper face side path forming member 47 is held on the upper wall surface 67*a* among the four wall surfaces 67*w* of the base frame 67**.

As described above, each member is held on the four wall surfaces **67*w* of the base frame 67, and the four wall surfaces 67*w*** are effectively utilized.

Figure 7:
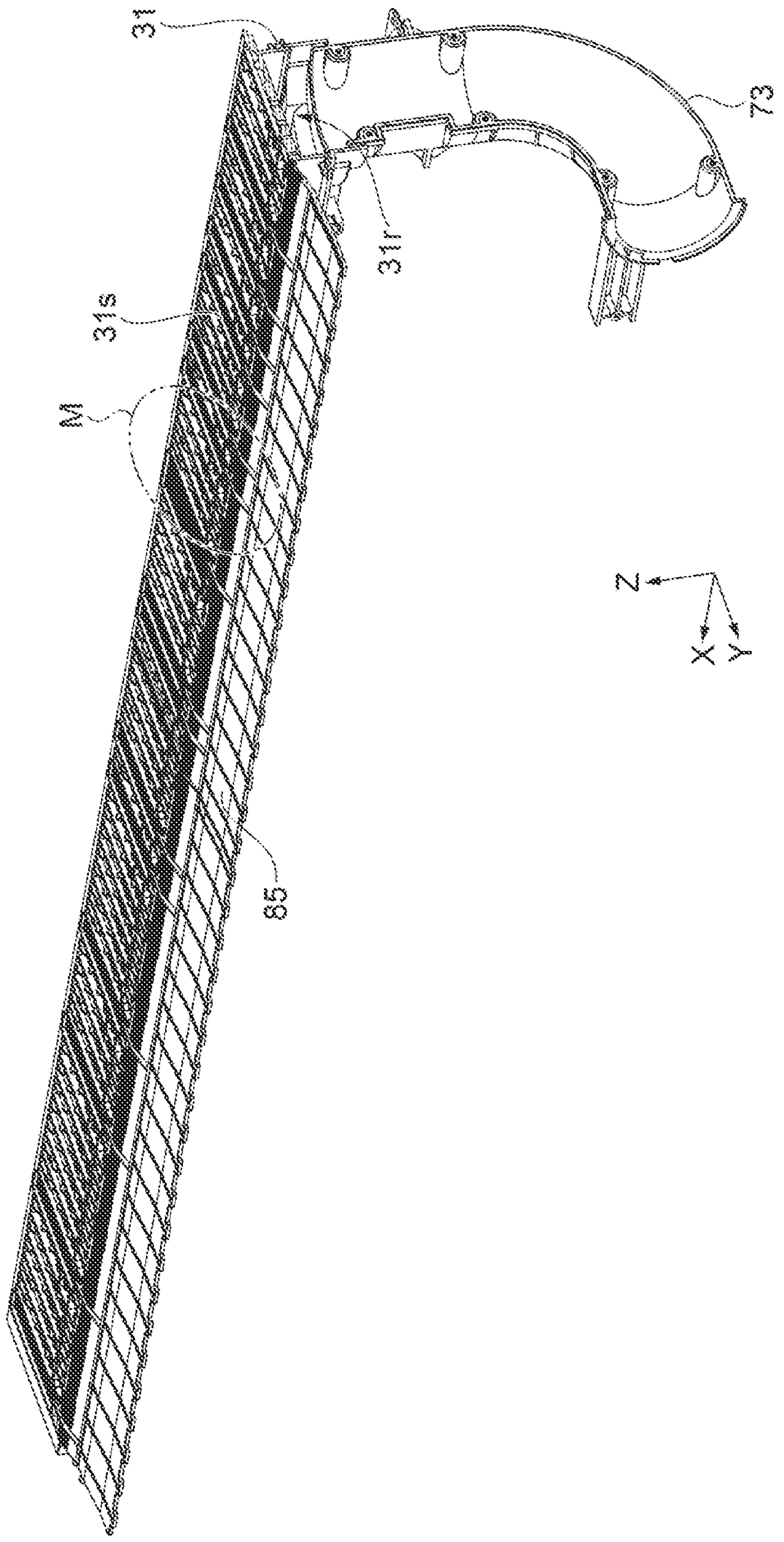

As illustrated in FIG. 7, the support portion 31 has an elongated shape in the X direction. The upper side of the duct 73 communicates with the negative pressure chamber **31*r*. Note that in FIG. 7, a state is illustrated in which the duct 73 is cut at a plane equally dividing the duct 73** in the X direction along the YZ plane.

The negative pressure chamber **31*r* is a space having a small room shape elongated in the X direction. The supporting surface 31*s* is disposed on the upper side of the negative pressure chamber 31*r*. Other than a region in the negative pressure chamber 31*r* in communication with the duct 73 and a plurality of openings described below of the support face 31*s*** are blocked.

A gutter portion 85 is coupled to the support face **31*s* in the +Y direction. A surface on the upper side of the gutter portion 85 is inclined to the lower side in the +Y direction. As a result, the gutter portion 85 guides the above-described ink ejected to be discarded to the support face 31*s* to the above-described maintenance tank 83**.

Figure 8:
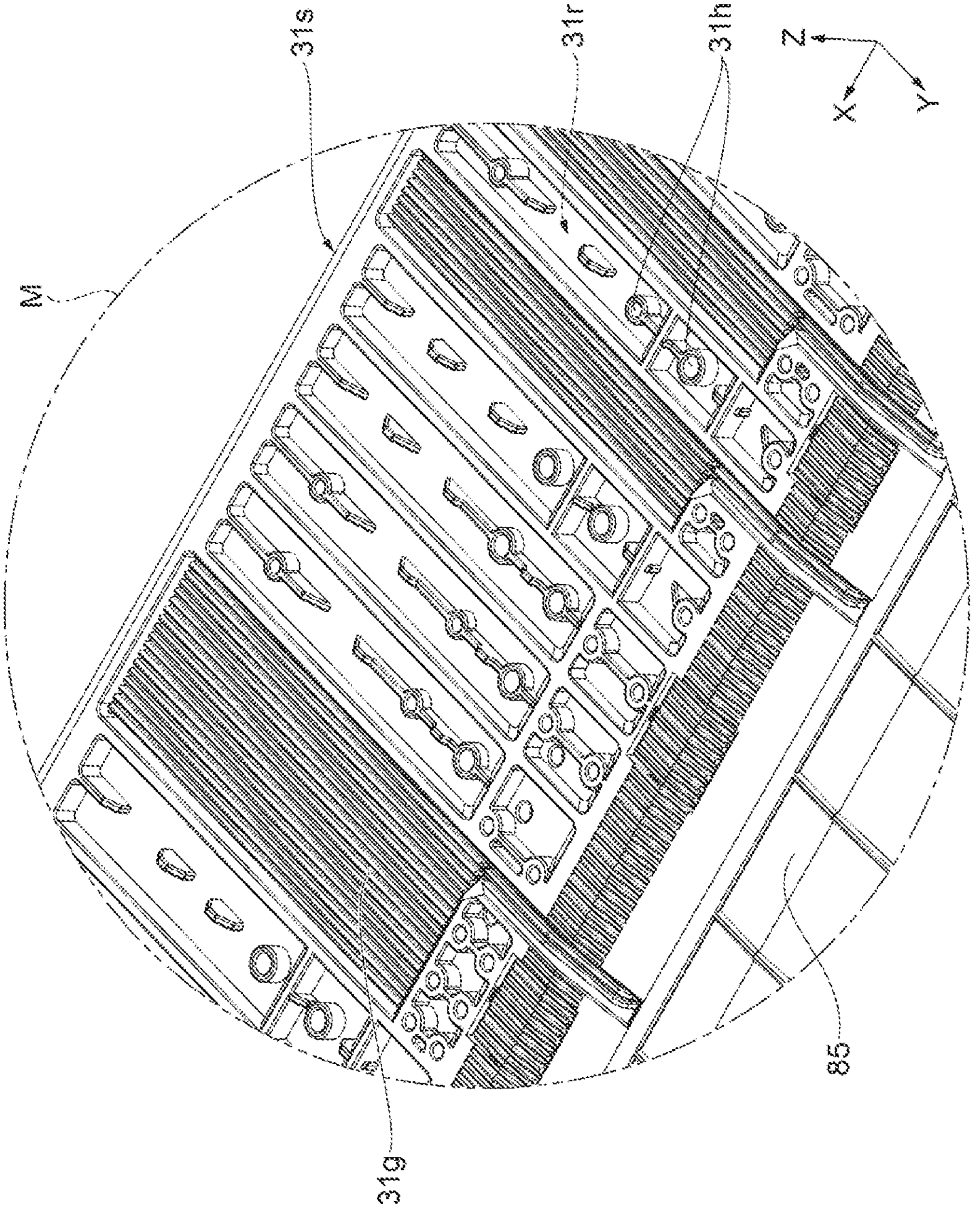
FIG. 8 is an enlarged view of a region M in FIG. 7.

As illustrated in FIG. 8, a plurality of openings **31*h* communicating with the negative pressure chamber 31*r* are disposed on the support face 31*s*. When a negative pressure is applied to the negative pressure chamber 31*r*, air is suctioned from the plurality of openings 31*h* to the negative pressure chamber 31*r*. Thus, the recording medium 22 (not illustrated) is adsorbed to the support face 31*s***.

In the support face **31*s*, a groove portion 31*a* is provided next to a region where the plurality of openings 31*h* are disposed. The groove portion 31*a* includes a plurality of grooves extending in the Y direction. In the groove portion 31*a*, the ink ejected to the support face 31*s* is guided to the gutter portion 85** in the +Y direction.

Figure 9:
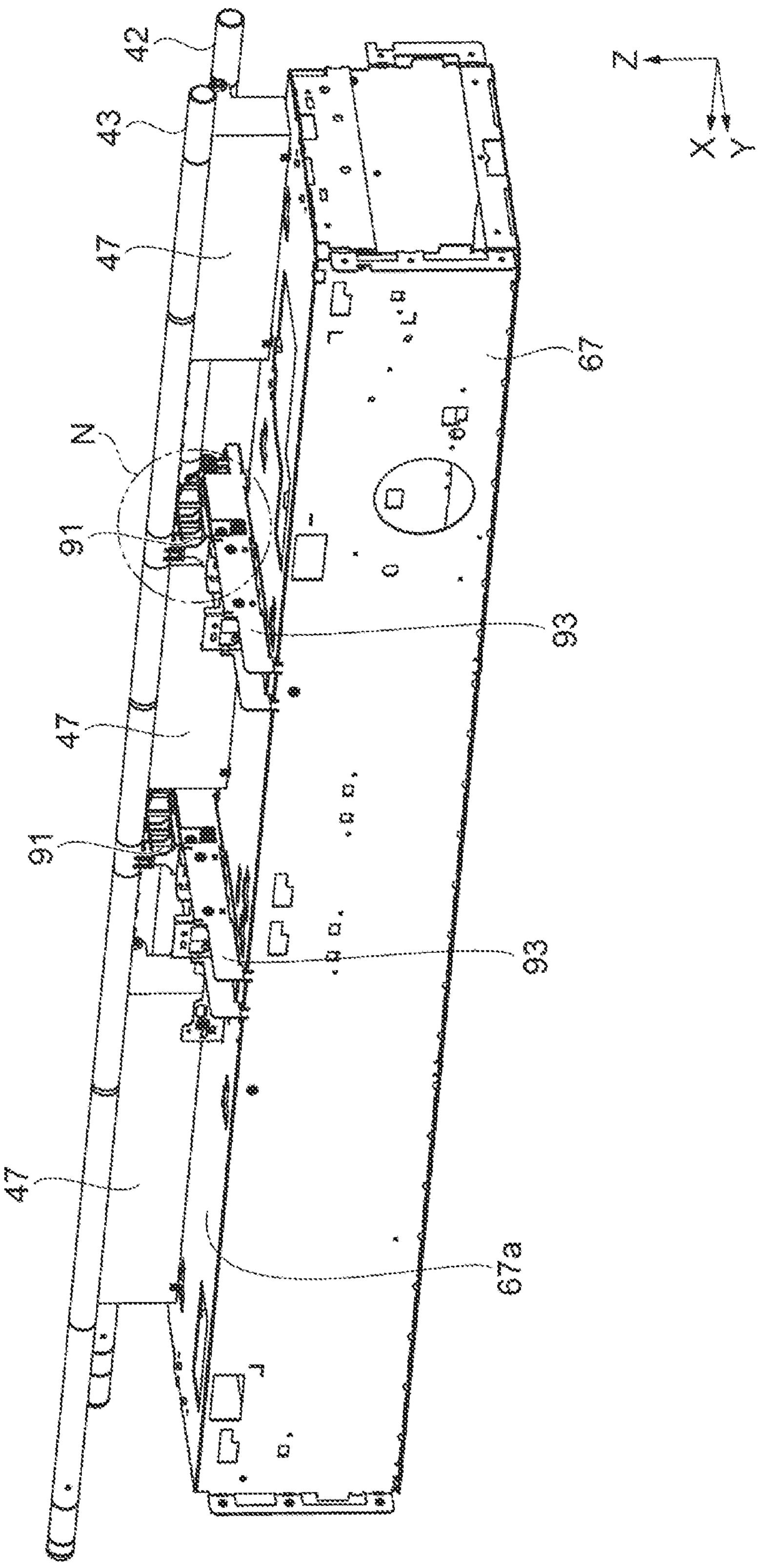
FIG. 9 is a perspective view illustrating an arrangement of shaft supporting members and support portion supporting members.

As illustrated in FIG. 9, a plurality of shaft supporting members 91 and a pair of support portion supporting members 93 are disposed in the base frame 67.

Two shaft supporting members 91 are disposed inside both ends of each of the shafts of the intermediate roller 42 and the transport roller 43 in the X direction on the upper wall surface **67*a* of the base frame 67. The shaft supporting members 91 are located on the lower side of the intermediate roller 42 and the transport roller 43 and rotatably support the shafts. Since the two shaft supporting members 91 support the above-described shaft at two points, occurrence of deflection in the intermediate roller 42 and the transport roller 43 is suppressed, and a transport property of the recording medium 22 is improved. The number of the shaft supporting members 91** is not limited to two, and may be three or more.

Figure 10:
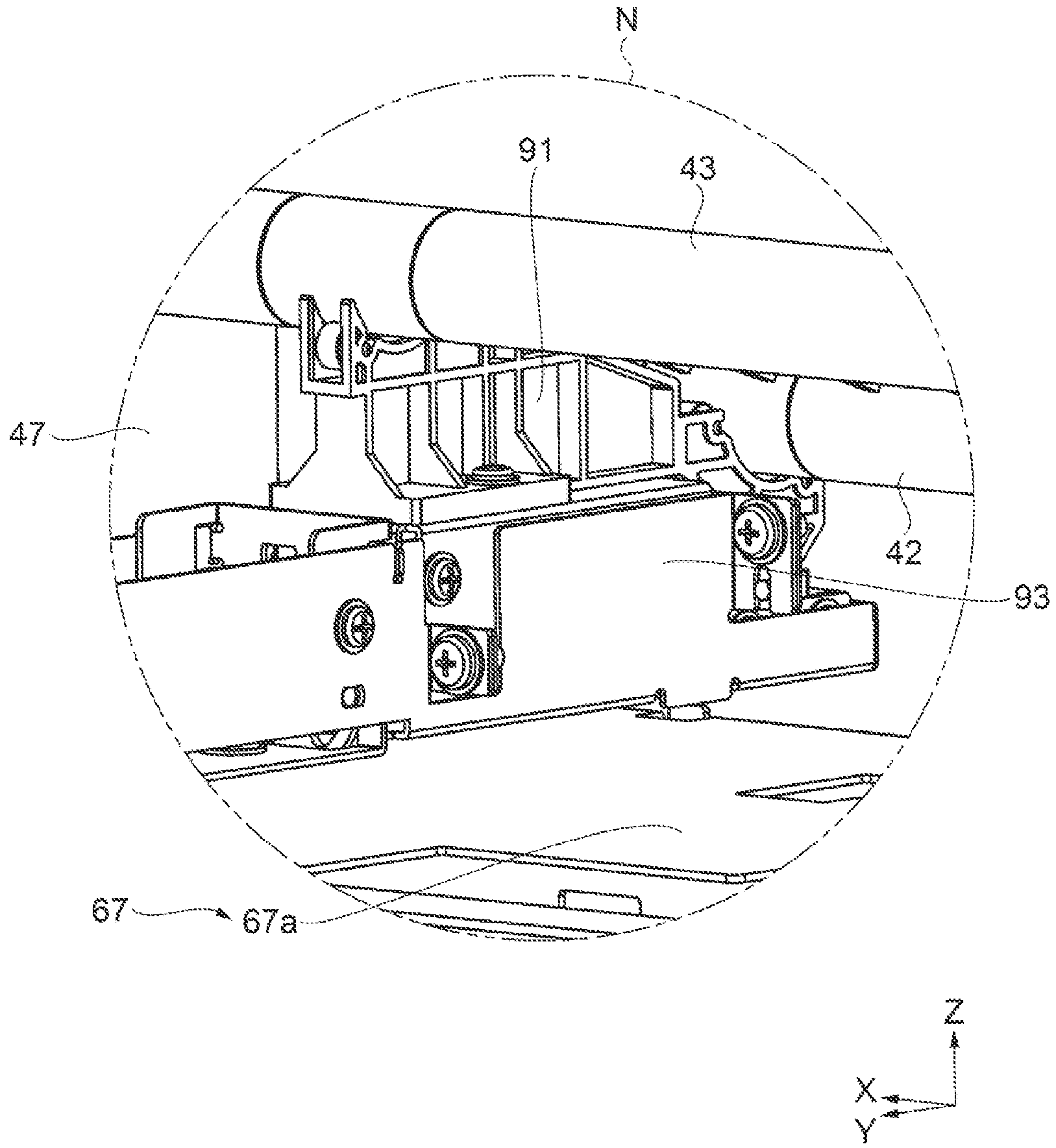
FIG. 10 is an enlarged view of a region N in FIG. 9.

Each of the pair of support portion supporting members 93 is disposed on the upper side that is in the Z direction of the negative pressure chamber **31*r* (not illustrated) to correspond to the two shaft supporting members 91. As illustrated in FIG. 10, each of the support portion supporting members 93 is supported on the upper wall surface 67***a* of the base frame 67 and extends in the Y direction, and supports the shaft supporting member 91 near an end in the −Y direction. The support portion 31 (not illustrated) is located on the upper side of the pair of support portion supporting members 93, and supported at the lower side by the pair of support portion supporting members 93. That is, the pair of support portion supporting members 93 supports the support portion 31 and the two shaft supporting members 91.

Returning to FIG. 9, three upper face side path forming members 47 are disposed side by side in the X direction. The three upper face side path forming members 47 are held on the upper wall surface 67*a* of the base frame 67 at positions other than positions where the shaft supporting members 91 and the support portion supporting members 93 are disposed in the X direction. Accordingly, interference between the upper face side path formation members 47 and the shaft supporting member 91 and the support portion supporting members 93 can be prevented.

As described above, each member is held on the upper wall surface 67*a* of the base frame 67, and the upper wall surface 67*a* is effectively utilized.

According to the present embodiments, the following advantages can be obtained.

In the recording device 10, the mechanical strength is improved, and the installation space can be reduced. Specifically, the frame 60 is formed by assembling the lower frame 65, the pair of side frames 62 and 63, and the base frame 67. The base frame 67 includes the four wall surfaces 67*w*, thus having excellent rigidity. The pair of side frames 62 and 63 support the base frame 67 therebetween. The lower frame 65 supports a lower end of each of the pair of side frames 62 and 63. As a result, the frame 60 having a small size and excellent rigidity is formed.

The frame 60 is assembled and the main components are held in the frame 60. Thus, the irregularities of the external shape can be reduced, and thus the design properties of the appearance of the recording device 10 can be improved. From the above, the recording device 10 having the excellent design properties and the mechanical strength and reduced installation space can be provided.

What is claimed is:

1. A recording device comprising:

a recording unit;

a support portion including a support face configured to support a recording medium on which recording is performed by the recording unit at a position facing the recording unit;

a transport path configured to transport the recording medium to the support portion;

a recording medium holding unit configured to hold a roll body on which the recording medium is wound and supply the recording medium to the transport path; and a frame configured to hold the recording unit, the support portion, the transport path, and the recording medium holding unit, wherein the frame includes a lower frame extending along a first direction and extending along a second direction intersecting the first direction, a pair of side frames extending along a third direction intersecting the first direction and the second direction, including lower ends fixed to the lower frame and upright in the third direction, and disposed at a predetermined interval in the first direction, and a base frame held between the pair of side frames and including four wall surfaces extending in the first direction, and functional components related to recording of the recording unit are disposed inside the four wall surfaces of the base frame.

2. The recording device according to claim 1, wherein at least two end portions of four end portions, on one side in the first direction, of the four wall surfaces of the base frame are fixed to one of the pair of side frames, and at least two end portions of four end portions, on the other side in the first direction, are fixed to the other of the pair of side frames.

3. The recording device according to claim 1, comprising a negative pressure mechanism and a duct, wherein the support portion includes a negative pressure chamber disposed below the support face and a plurality of openings provided at the support face so that the support face and the inside of the negative pressure chamber are in communication, the negative pressure mechanism applies a negative pressure to the negative pressure chamber, and the duct causes the negative pressure chamber and the negative pressure mechanism to communicate with each other and is disposed inside the four wall surfaces of the base frame.

4. The recording device according to claim 3, wherein the negative pressure chamber is held at an upper wall surface among the four wall surfaces of the base frame, and the support face is disposed on the upper side of the negative pressure chamber to face the recording unit.

5. The recording device according to claim 3, wherein the negative pressure mechanism is held at a front wall surface among the four wall surfaces of the base frame.

6. The recording device according to claim 4, comprising a maintenance tank configured to collect a liquid ejected by the recording unit, wherein the maintenance tank is disposed between the upper wall surface of the base frame and the negative pressure chamber.

7. The recording device according to claim 4, wherein the transport path includes, upstream in a transport direction of the recording medium transported to the support face, a transport roller configured to transport the recording medium in the transport direction, the transport roller includes a shaft, both ends of the shaft being rotatably held by the pair of side frames, and a plurality of shaft supporting members configured to rotatably support the shaft are disposed inside, in the first direction, the both ends of the shaft at the upper wall surface of the base frame.

8. The recording device according to claim 7, comprising a pair of support portion supporting members disposed in the third direction of the negative pressure chamber, supporting the shaft supporting members, and extending in the second direction, wherein the support portion is supported by the pair of support portion supporting members.

9. The recording device according to claim 7, wherein the base frame holds an upper face side path forming member configured to form the transport path at the upper wall surface among the four wall surfaces, and the upper face side path forming member is held at the base frame at a position other than a position where a shaft supporting member is disposed in the first direction.

10. The recording device according to claim 1, wherein the recording medium holding unit is disposed between the base frame and the lower frame, and the base frame holds a lower face side path forming member configured to form the transport path at a lower wall surface among the four wall surfaces, and holds a rear face side path forming member configured to form the transport path at a rear wall surface among the four wall surfaces.

11. The recording device according to claim 1, wherein when viewed from the third direction, the recording medium holding portion is located on a front wall surface side of the base frame, and at least a part of the recording medium holding portion is disposed overlapping the base frame in the second direction.

12. The recording device according to claim 1, wherein the frame includes a main frame configured to support the recording unit movably in the first direction, and the main frame is supported at upper portions of the pair of side frames and extends in the first direction, and is disposed on an upper rear side of the base frame when viewed from the second direction.

13. The recording device according to claim 2, wherein the frame includes a sub-frame and a sub-base frame on one or both of the one side and the other side in the first direction, a side frame and the sub-frame are disposed facing each other across the sub-base frame, and the sub-base frame includes three wall surfaces extending in the first direction.

14. The recording device according to claim 13, wherein the base frame and the sub-base frame are located in different positions when viewed from the second direction.

15. The recording device according to claim 1, comprising four leg portions configured to support the lower frame, wherein the side frames include a first portion extending in the second direction and a second portion bent and extending in the first direction from the first portion, and each of the four leg portions is disposed overlapping one of the first portion and the second portion when viewed from the third direction.

* * * * *